(12) United States Patent
Sawada et al.

(10) Patent No.: US 11,276,516 B2
(45) Date of Patent: Mar. 15, 2022

(54) MAGNETIC POWDER FOR HIGH-FREQUENCY APPLICATIONS AND MAGNETIC RESIN COMPOSITION CONTAINING SAME

(71) Applicant: Sanyo Special Steel Co., Ltd., Himeji (JP)

(72) Inventors: Toshiyuki Sawada, Himeji (JP); Kodai Miura, Himeji (JP)

(73) Assignee: Sanyo Special Steel Co., Ltd., Himeji (JP)

( * ) Notice: Subject to any disclaimer, the term of this patent is extended or adjusted under 35 U.S.C. 154(b) by 249 days.

(21) Appl. No.: 16/344,948

(22) PCT Filed: Oct. 26, 2017

(86) PCT No.: PCT/JP2017/038813
§ 371 (c)(1),
(2) Date: Apr. 25, 2019

(87) PCT Pub. No.: WO2018/096870
PCT Pub. Date: May 31, 2018

(65) Prior Publication Data
US 2019/0267169 A1   Aug. 29, 2019

(30) Foreign Application Priority Data
Nov. 24, 2016   (JP) .............................. JP2016-227767

(51) Int. Cl.
| | | |
|---|---|---|
| *H01F 1/147* | (2006.01) | |
| *B22F 1/00* | (2006.01) | |
| *C08K 3/08* | (2006.01) | |
| *C22C 30/00* | (2006.01) | |
| *C22C 38/00* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/52* | (2006.01) | |
| *C22C 38/58* | (2006.01) | |

(52) U.S. Cl.
CPC ........ *H01F 1/14733* (2013.01); *B22F 1/0059* (2013.01); *C08K 3/08* (2013.01); *C22C 30/00* (2013.01); *C22C 38/00* (2013.01); *C22C 38/002* (2013.01); *C22C 38/44* (2013.01); *C22C 38/46* (2013.01); *C22C 38/48* (2013.01); *C22C 38/50* (2013.01); *C22C 38/52* (2013.01); *C22C 38/58* (2013.01); *H01F 1/14758* (2013.01); *B22F 2301/35* (2013.01); *B22F 2998/10* (2013.01); *C08K 2003/0856* (2013.01); *C08K 2201/01* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 8,035,569 B2 | 10/2011 | Maruko et al. | |
| 8,177,923 B2 | 5/2012 | Ohta et al. | |
| 9,117,582 B2 | 8/2015 | Nakamura | |
| 9,190,195 B2 | 11/2015 | Kino | |
| 10,090,088 B2 | 10/2018 | Suetsuna et al. | |
| 2014/0240077 A1* | 8/2014 | Otsuka ................ | C22C 33/0278 336/233 |
| 2015/0083960 A1 | 3/2015 | Tanada et al. | |
| 2015/0104664 A1 | 4/2015 | Ikari et al. | |
| 2017/0323711 A1 | 11/2017 | Maezawa et al. | |
| 2019/0206596 A1 | 7/2019 | Sawada et al. | |

FOREIGN PATENT DOCUMENTS

| | | |
|---|---|---|
| CN | 101501932 A | 8/2009 |
| CN | 101892425 A | 11/2010 |
| CN | 104001924 A | 8/2014 |
| CN | 104282406 A | 1/2015 |
| CN | 109414760 A | 3/2019 |
| JP | H578794 A | 3/1993 |
| JP | 3447183 B2 | 9/2003 |
| JP | 2004281737 A | 10/2004 |
| JP | 2008106334 A | 5/2008 |
| JP | 2010062484 A | 3/2010 |
| JP | 2012160726 A | 8/2012 |
| JP | 201360665 A | 4/2013 |
| JP | 2013149854 A | 8/2013 |
| JP | 201561052 A | 3/2015 |
| JP | 201612715 A | 1/2016 |
| JP | 201689242 A | 5/2016 |
| JP | 2016178275 A | 10/2016 |
| JP | 201759816 A | 3/2017 |
| WO | 0025326 A1 | 5/2000 |
| WO | 2011155494 A1 | 12/2011 |

OTHER PUBLICATIONS

Machine translation of CN 101892425A. (Year: 2010).*

* cited by examiner

*Primary Examiner* — Xiaowei Su
(74) *Attorney, Agent, or Firm* — The Webb Law Firm

(57) ABSTRACT

There is provided a magnetic powder for high frequency use including, in percent by mass, 0.2 to 5.0% C and at least one selected from Group IV to VI elements, Mn, and Ni in a total of 0.1 to 30%, the balance being Fe or/and Co, inclusive 0% for Co), and incidental impurities, wherein the saturation magnetization exceeds 1.0 T and satisfies Expression (1): Co%/(Co%+Fe%)≤0.50. According to the magnetic powder, there is provided a metal magnetic powder having a saturation magnetization exceeding 1.0 T and also having a high FR of 200 MHz or more and a magnetic resin composition including the metal magnetic powder.

8 Claims, No Drawings

MAGNETIC POWDER FOR HIGH-FREQUENCY APPLICATIONS AND MAGNETIC RESIN COMPOSITION CONTAINING SAME

CROSS-REFERENCE TO RELATED APPLICATIONS

This application is the United States national phase of International Application No. PCT/JP2017/038813 filed Oct. 26, 2017, and claims priority to Japanese Patent Application No. 2016-227767 filed Nov. 24, 2016, the disclosures of which are hereby incorporated by reference in their entirety.

TECHNICAL FIELD

The present invention relates to a magnetic powder for high frequency use and a magnetic resin composition including the magnetic powder.

BACKGROUND ART

Recent trends in electronic equipment and automobile power supplies are use of higher frequencies and output of higher power. Various magnetic components, such as noise-reduction parts, electromagnetic wave absorbers, transformers, reactor choke coils, antenna magnetic cores, inductors, and various magnetic sensors, are used in these fields. In these magnetic components, metallic magnetic materials having higher saturation magnetization than so-called oxide-based ferrites are widely used. In order to reduce the loss due to eddy current of metallic magnetic material used in such magnetic components, powdered or flaky metallic magnetic material is mixed with resin or rubber to form a magnetic resin composition, which is then molded into a sheet or components with various shapes.

Examples of metallic magnetic materials used in such magnetic components include elemental iron, Fe—Si—Al alloys, Fe—Si—Cr alloys, Fe—Ni alloys, carbonyl irons, amorphous alloys, and nano-crystalline alloys. For example, Patent Document 1 (JP2016-178275A) discloses a power inductor that includes a cover composed of a platy metal composite and has high magnetic permeability, a high saturation magnetic flux density, and excellent DC-bias characteristics. Furthermore, Patent Document 2 (WO2011/155494) discloses Fe-group-based soft magnetic powder that has superior soft magnetic characteristics required for a dust magnetic core in, for example, a choke coil and reactor coil. Furthermore, Patent Document 3 (JP2015-61052) discloses a magnetic material composed of magnetic particles that contains Fe—Si—M soft magnetic alloy containing sulfur atoms and are bonded together via oxide films. This material can be used primarily in electronic components, such as magnetic cores of coils and inductors.

Patent Document 4 (JP2016-12715) discloses a dust core containing powder of a crystalline magnetic material and powder of an amorphous magnetic material and having excellent magnetic characteristics even in a high frequency band of 1 MHz or more, and further disclose a method for manufacturing the dust core, an electric/electronic component including the dust core, and an electric/electronic device equipped with the electric/electronic component. Patent Document 5 (JP2013-60665A) discloses a nano-crystalline soft magnetic alloy having a high saturation magnetic flux density, excellent soft magnetic characteristics, and particularly excellent AC magnetic properties. This alloy is usable in various transformers, reactor choke coils, noise-reduction parts, pulse power magnetic parts for laser power sources and accelerators, pulse transformers for communication, motor magnetic cores, generators, magnetic sensors, antenna magnetic cores, current sensors, magnetic shields, electromagnetic wave absorbing sheets, and yoke materials, These metallic magnetic materials are designed so as to have reduced hysteresis loss by a reduction in the coercive force and reduced eddy current by powdering or flaking through optimization of the alloy composition, constituent phase and process.

CITATION LIST

Patent Documents

Patent Document 1: JP2016-178275A
Patent Document 2: WO2011/155494
Patent Document 3: JP2015-61052A
Patent Document 4: JP2016-12715A
Patent Document 5: JP2013-60665A

SUMMARY OF INVENTION

Meanwhile, in a high-frequency region exceeding 100 MHz, the influence of loss due to various resonance phenomena is noticeable besides such hysteresis loss and eddy current loss. The loss due to the resonance phenomena can be evaluated by the ratio tan δ ($\mu''/\mu'$) of the imaginary permeability ($\mu''$) to the real permeability ($\mu'$), and this tan δ is calculated by measuring the frequency characteristics of permeability ($\mu'$ and $\mu''$). Although $\mu''$ is barely detected at low frequencies, $\mu''$ rapidly increases depending on the magnetic material when the frequency exceeds a specific value. Accordingly, the maximum frequency at which a magnetic component can be used can be evaluated with the frequency at which tan δ reaches, for example, 0.1. Hereinafter, the frequency at which tan δ reaches 0.1 is referred to as "FR". Magnetic powders and the magnetic resin compositions having higher "FR" are evaluated to be more suitable for higher frequency use.

The Fe—Si—Al alloy powder usually has a saturation magnetization of 1.0 T and a FR of about 20 MHz or less. Fe—Si—Cr alloy powder usually has a high saturation magnetization of about 1.2 T, but has a FR of about 50 MHz or less. Thus, no conventional powder is suitable for use in a high frequency region in which FR exceeds 100 MHz or 200 MHz, nor has a saturation magnetization exceeding 1.0 T.

Accordingly, an object of the present invention is to provide a metal magnetic powder having a saturation magnetization exceeding 1.0 T and also having a high FR of 200 MHz or more and a magnetic resin composition including the metal magnetic powder.

An aspect of the present invention provides a magnetic powder for high frequency use, comprising, in percent by mass, 0.2 to 5.0% C and at least one selected from Group IV to VI elements, Mn, and Ni in a total amount of 0.1 to 30%, the balance being Fe or/and Co (inclusive 0% for Co) and incidental impurities, wherein the saturation magnetization exceeds 1.0 T and satisfies Expression (1): Co%/(Co%+Fe%)≤0.50.

Another aspect of the present invention provides the magnetic powder further comprising at least one element selected from B, N and P in a total amount of 2% or less by mass, and satisfies Expression (2): C%+B%+N%+P%≤5.0%.

Still another aspect of the present invention provides the magnet powder further comprising at least one element selected from Cu, Al and Si in a total amount of 10% or less by mass, and satisfies Expression (3): Ti%+Zr%+Hf%+V%+Nb%+Ta%+Cr%+Mo%+W%+Mn%+Ni%+Cu%+Al%+Si%≤30%.

Another aspect of the present invention provides a magnetic resin composition including the magnetic powder.

The present invention as described above provides a metal magnetic powder having an unprecedented high saturation magnetization exceeding 1.0 T and having a high FR of 200 MHz or more, and a magnetic resin composition including the metal magnetic powder, in which such a high saturation magnetization increases the maximum permissible magnetic flux density of the magnetic component with respect to the applied external magnetic field, resulting in reduction in size and thickness of the magnetic component and improvement in so-called DC superposition characteristics.

DESCRIPTION OF EMBODIMENT

Magnetic Powder

The conditions of the present invention will now be described. In the following description, the amounts of the components in the composition are represented in percent by mass.

The magnetic powder of the present invention contains 0.2 to 5.0% of C, which is an essential element for increasing FR. At a C content less than 0.2%, FR is low. At a C content exceeding 5.0%, the saturation magnetization decreases. The preferred range is more than 0.4% and less than 4.0%, more preferably more than 0.8% and less than 3.5%, further preferably more than 1.5% and less than 3.0%.

The magnetic powder of the present invention further contains at least one element selected from Group IV to VI elements, Mn, and Ni in a total amount of 0.1 to 30%. Examples of the Group IV to VI elements include Ti, Zr, Hf, V, Nb, Ta, Cr, Mo, and W. The Group IV to VI elements, Mn and/or Ni are essential for lowering the ignitability of the powder in addition to improving quenching characteristics and increasing FR, and these elements can be treated in their total amount. The Group IV to VI elements are particularly effective in increasing FR. Although unknown in detail, the cause of these effects is presumed to be due to the formation of carbide. Mn is particularly effective in improving the quenching characteristics. Ni is particularly effective in reducing ignitability. At a total amount of less than 0.1%, these effects can not be achieved. At a total amount exceeding 30%, the saturation magnetization decreases. Preferably, the total amount is more than 2% and less than 25%, more preferably more than 4% and less than 10%.

The balance of the magnetic powder of the present invention is Fe or/and Co (inclusive 0% for Co) and incidental impurities. The balance may be Fe and incidental impurities, and may be Fe, Co and incidental impurities.

The magnetic powder of the present invention satisfies the formula (1): Co%/(Co%+Fe%)≤0.50. Fe and Co are elements for generating a martensitic phase having ferromagnetism with a high saturation magnetization. The saturation magnetization is affected by the ratio of Fe and Co, as known as a so-called slater poling curve. If the ratio Co%/(Co%+Fe%) exceeds 0.5, the saturation magnetization decreases and material cost is high. The ratio Co%/(Co%+Fe%) is preferably more than 0.01 and less than 0.40, more preferably more than 0.10 and less than 0.35. The content of Co may be 0%.

The magnetic powder of the present invention has a saturation magnetization exceeding 1.0 T. A high saturation magnetization exceeding 1.0 T is necessary from the viewpoint of a reduction in size and thickness of the magnetic component and an improvement in DC superposition characteristics. A high saturation magnetization increases the maximum permissible magnetic flux density of the magnetic component relative to the applied external magnetic field, resulting in advantages such as reductions in size and thickness of the magnetic component and improvement in so-called DC superposition characteristics. The saturation magnetization preferably exceeds 1.10 T, more preferably exceeds 1.25 T.

The magnetic powder according to the present invention may further comprises at least one element selected from B, N and P in a total amount of 2% or less by mass, and satisfies Expression (2): C%+B %+N%+P%≤5.0%. B, N, and P have the effect of increasing FR, although not as much as C. B and P, similar to C, are semiconductor elements, and N, similar to C, is an interstitial element for Fe, so that they can be partly replaced with C. At a total content of B, N and P exceeding 2%, the alloy has excess hardness. Consequently, the filling ratio of the magnetic powder insufficiently increases under an applied pressure during the production of a magnetic component containing this powder. Accordingly, the total content is preferably 2% or less, more preferably more than 0.01% and less than 1%, further preferably more than 0.1% and less than 0.5%. If C%+B%+N%+P% exceeds 5.0%, the saturation magnetization decreases. Accordingly, the total content is preferably 5.0% or less, more preferably more than 0.4% and less than 4.0% or less, more preferably more than 0.8% and less than 3.5%, particularly preferably more than 1.5% and less than 3.0%.

The magnetic powder of the present invention may further comprise at least one element selected from Cu, Al and Si in a total amount of 10% or less by mass, and satisfies Expression (3): Ti%+Zr%+Hf%+V%+Nb%+Ta%+Cr%+Mo%+W%+Mn%+Ni%+Cu%+Al%+Si%≤30%. Since Cu, Al and Si can improve corrosion resistance, they can be added as necessary. However, a content exceeding 10% leads to poor quenching characteristics and insufficient FR. Accordingly, the total content of Cu, Al and Si is preferably 10% or less, more preferably more than 0.1% and less than 5%, further preferably more than 2% and less than 3%. The saturation magnetization decreases if Ti%+Zr%+Hf%+V%+Nb%+Ta%+Cr%+Mo%+W%+Mn%+Ni%+Cu%+Al%+Si% exceeds 30%. Thus, the total content is preferably 30% or less, more preferably more than 2% and less than 25%, further preferably more than 4% and less than 10%.

The most important feature of the present invention is not to reduce the coercive force of the magnetic powder based on a reduction in hysteresis loss as in the conventional technology, but to intentionally increase the coercive force of the magnetic powder to reduce the loss resulting from the resonance phenomena. This concept is quite different from the design concept of conventional alloys. In detail, the present inventors found that the resonance frequency increased and thus FR shifts to a higher frequency range, as the coercive force of the magnetic powder increases. As described above, the object of the present invention is not to reduce the coercive force (i.e., soften magnetization) as in the conventional technology. In the present invention, the term "magnetic powder" or "magnetic resin composition" is used instead of the expression "soft magnetic" used in terms such as "soft magnetic powder" or "soft magnetic resin composition". The term "magnetic" as used herein includes "soft magnetic".

Production of Magnetic Powder

Preferred examples of a method for producing the magnetic powder of the present invention include rapid solidification processes, such as various types of atomization, e.g., water atomization, gas atomization, and disk atomization; and plastic forming processes, such as pulverization and flattening. If the martensite phase is not sufficiently generated through these processes, the martensite phase can be generated by quenching treatment. The present inventors have discovered that Fe-based alloy containing a large amount of C contains a martensite phase containing a large amount of C and dislocations after, for example, rapid solidification, quenching or plastic forming and the FR of the powder rich in this phase is significantly high.

Furthermore, the elements added in the present invention alter the quenching characteristics and also shifts the martensite start temperature (hereinafter referred to as Ms point). A significantly low Ms point causes an excess amount of residual austenite phase (with low saturation magnetization) to remain after rapid solidification, quenching, and plastic formation, resulting in insufficient saturation magnetization. In this case, a high-temperature tempering treatment (a secondary hardening treatment of, for example, so-called tool steel) facilitates decomposition of the residual austenite phase, resulting in a sufficient amount of martensite phase. Although a sufficient amount of martensite phase can be generated also by subzero treatment, this treatment is complicated and thus the high-temperature tempering treatment described above is preferred. As the treatment temperature rises, the high-temperature tempering treatment facilitates the decomposition of the residual austenite phase and the saturation magnetization increases. At a significantly high temperature, the martensite phase transforms into the ferrite phase, and the FR decreases. High-temperature tempering treatment is, therefore, performed at a temperature of preferably less than 700° C., more preferably less than 650° C., still more preferably less than 600° C.

As described above, the constituent phases in the magnetic powder varies with the composition of the present invention, process, and heat treatment. The amount of the martensite phase formed increases with, for example, an increase in the cooling rate at the time of the solidification, increases in the temperature and the cooling rate at the time of the quenching, the tempering at the temperature described above, and an increase in the intensity of the plastic forming. Appropriate selection of conditions for these general items can generate a sufficient amount of martensite phase, resulting in a high FR. In order to achieve a high FR exceeding 200 MHz, it is preferred that the main phase (more than 50%) of the constituent phases observed with an optical microscope is a martensite phase. In contrast, in order to achieve a high saturation magnetization, the area ratio of the residual austenite phase is preferably less than 50%, more preferably less than 30%, still more preferably less than 10%. The formation of such a sufficient amount of martensite phase gives a high coercive force of exceeding 2400 A/m, resulting in a high FR exceeding 200 MHz. If a magnetic field is applied in the longitudinal direction of the flaky magnetic powder, the coercive force exceeds 2400 A/m. It is believed that the coercive force is intricately affected by crystal magnetic anisotropy constant, dislocation density, solid solution elements, and fine precipitates.

Furthermore, the main phase of the magnetic powder produced by such a process is a martensite crystalline phase. Such a magnetic powder is distinctly different from the soft magnetic powder composed of an amorphous main phase conventionally used in, for example, dust magnetic cores. Soft magnetic powders of nano-crystal grains produced by heat treatment from such an amorphous phase have also been proposed, but such powders do not generate a martensite phase containing a large amount of dislocations from the amorphous phase. Accordingly, the magnetic powder of the present invention is also distinctly different from the soft magnetic powder containing such a nano-crystalline grain phase.

The composition of the magnetic powder according to the present invention is incapable of forming neither a high degree of amorphous phase nor nano-crystal grain phase. Accordingly, the average crystal grain size (the "crystal grain" referred to here are so-called "conventional austenite grain") is at least 100 nm or more, more than 2 µm when produced by water atomization with a high solidification rate, more than 5 µm when produced by gas atomization and disk atomization, or more than 15 µm when produced by the cast grinding. The average grain size of the powder is preferably less than 80 µm, more preferably less than 50 µm, still more preferably less than 35 µm from the viewpoint of high yield by the above-described process and ease of production of the various shapes of magnetic components.

Magnetic Resin Composition

The magnetic resin composition of the present invention includes the magnetic powder. For example, in the magnetic resin composition including the powder of the present invention, the frequency at which µ" abruptly increases is 100 MHz or more (FR is 200 MHz or higher), and thus the resin composition can be used up to at least 100 MHz. Furthermore, in the case where the magnetic resin composition is shaped into a magnetic sheet, any conventionally proposed general form other than powder can be applied, and magnetic sheets can be prepared by a conventionally proposed general method.

EXAMPLES

The effects of the present invention will now be clarified by the following examples, but the examples should not be construed to limit the scope of the present invention.

(1) Preparation of Magnetic Powder

Powder of a predetermined composition was prepared by any one of water atomization, gas atomization, disk atomization, or pulverization after alloying by melting (casting pulverization), and was sieved through screens of prescribed mesh sizes. The sizes of the classified grains were used for evaluation. Atomization, which can be performed by conventionally proposed general methods, was performed as follows: Molten alloy was discharged from a nozzle having a diameter of 2 mm under an aluminum crucible and divided by jet streams of high-pressure water or high pressure gas (argon or nitrogen) or by centrifugal force with a rotary disk. It should be noted that the amount of N can be adjusted by selecting a material containing a high concentration of N or/and selecting high pressure nitrogen gas for atomization. These powder samples were partially quenched and/or tempered in an Ar atmosphere furnace. These treatments were maintained at a predetermined temperature and time, and then the furnace was cooled.

(2) Evaluation of Magnetic Powder Sample

The average grain size, saturation magnetization, average crystal grain size, area ratio of the martensite phase and the residual austenite phase, and permeability were evaluated for the resulting powder samples. The average grain size was evaluated by laser diffraction and the saturation magnetization was evaluated with a vibrating sample magnetometer (VSM). The average crystal grain size, the area ratio of the martensite phase and the residual austenite phase were evaluated by analysis of optical microscopic images of samples embedded in resin, microtomed, and etched.

(3) Preparation and Evaluation of Magnetic Resin Composition

A thin magnetic sheet of a magnetic resin composition was prepared and magnetic permeability was evaluated. Chlorinated polyethylene was dissolved in toluene and the magnetic powder was added to and dispersed in the solution. This dispersion was applied to polyester resin into a thickness of about 400 μm and dried at normal temperature and normal humidity. Then, the resultant was pressed at 130° C. under a pressure of 15 MPa to prepare a magnetic sheet. The magnetic sheet was 150 mm by 150 mm with a thickness of 200 μm. The volume filling ratio of the powder in the magnetic sheet were all about 65%. This magnetic sheet was cut out into a ring shape having an outer diameter of 7 mm and an inner diameter of 3 mm, which was used in measurement of the dependence of impedance characteristics on frequency at room temperature with an impedance measuring device. Tan δ was calculated from the resulting permeability ($\mu'$ and $\mu''$) and was used to evaluate the high frequency characteristics using the frequency at which the Tan δ reaches 0.1, i.e., FR.

Results from the various evaluations described above are shown in Tables 1 to 3, where Nos. 1 to 64 are Inventive Examples and Nos. 65 to 92 are Comparative Examples. The overall evaluation is as follows:

(1) The coercivity of each example powder measured with a coercive force meter were all above 2400 A/m, which was higher than the upper measuring limit.

(2) The results of the optical microscopic observation of the embedded polished sample demonstrate that all powders of Examples had a martensite main phase.

(3) The powders of Examples and Comparative Examples were classified to 45 μm or less, and a Hartmann explosion experiment was carried out with 1 g of the sample. Only Nos. 81 to 92 generated a big flame.

(4) The magnetic sheets of Comparative Examples Nos. 72 to 75 each had a thickness of 250 to 300 μm, which was larger than the thickness 180 to 220 μm of the magnetic sheets of Examples of the invention and other Comparative Examples. Thus, the powders of Comparative Examples Nos. 72 to 75 had insufficiently increased filling ratios of the powders in the sheets after press working.

TABLE 1

| | Composition of raw material powder (% by mass) | | | | | | | | | | | | |
|---|---|---|---|---|---|---|---|---|---|---|---|---|---|
| No. | C | Ti | Zr | Hf | V | Nb | Ta | Cr | Mo | W | Mn | Ni | Fe |
| 1 | 5 | 3 | 2 | 0 | 0 | 0 | 4 | 1 | 3 | 3 | 0 | 0 | 63.2 |
| 2 | 5 | 1 | 0 | 0 | 0 | 1 | 0 | 24 | 0 | 0 | 2 | 2 | 45.5 |
| 3 | 5 | 4 | 3 | 4 | 0 | 4 | 4 | 1 | 1 | 0 | 4 | 2 | 40.8 |
| 4 | 4.5 | 0 | 2 | 5 | 2 | 4 | 0 | 5 | 0 | 3 | 3 | 2 | 41.7 |
| 5 | 4 | 0 | 1 | 1 | 0 | 1 | 1 | 4 | 0 | 0 | 4 | 5 | 63.2 |
| 6 | 3.5 | 5 | 2 | 1 | 1 | 0 | 0 | 5 | 4 | 2 | 2 | 3 | 57.2 |
| 7 | 3 | 1 | 0 | 0 | 1 | 0 | 0 | 0 | 5 | 0 | 0 | 3 | 43.5 |
| 8 | 2.5 | 0 | 0 | 0 | 30 | 0 | 0 | 0 | 0 | 0 | 0 | 0 | 40.5 |
| 9 | 2 | 5 | 0 | 5 | 2 | 1 | 1 | 1 | 3 | 1 | 3 | 0 | 68.4 |
| 10 | 1.5 | 1 | 1 | 5 | 3 | 1 | 0 | 1 | 5 | 1 | 4 | 2 | 67.1 |
| 11 | 1 | 0 | 0 | 0 | 0 | 0 | 0 | 30 | 0 | 0 | 0 | 0 | 62.1 |
| 12 | 0.5 | 2 | 4 | 1 | 3 | 0 | 1 | 2 | 1 | 5 | 2 | 1 | 54.3 |
| 13 | 0.3 | 1 | 4 | 3 | 1 | 0 | 2 | 4 | 2 | 5 | 1 | 1 | 45.4 |
| 14 | 0.2 | 5 | 3 | 4 | 4 | 2 | 5 | 5 | 1 | 0 | 1 | 0 | 41.9 |
| 15 | 0.2 | 1 | 2 | 5 | 2 | 5 | 4 | 0 | 0 | 5 | 2 | 3 | 35.4 |
| 16 | 0.2 | 2 | 4 | 1 | 2 | 4 | 5 | 2 | 0 | 1 | 4 | 2 | 51.0 |
| 17 | 5 | 0 | 0 | 0 | 0 | 0 | 0 | 0 | 0 | 0 | 0 | 0.1 | 85.4 |
| 18 | 5 | 0 | 0 | 0 | 0 | 0 | 0 | 0 | 0 | 0 | 0.1 | 0 | 85.4 |
| 19 | 4 | 0 | 0 | 0 | 0 | 0 | 0 | 0 | 0 | 0.1 | 0 | 0 | 76.7 |
| 20 | 4 | 0 | 0 | 0 | 0 | 0 | 0 | 0 | 0.1 | 0 | 0 | 0 | 57.5 |
| 21 | 3 | 0 | 0 | 0 | 0 | 0 | 0 | 0.1 | 0 | 0 | 0 | 0 | 77.5 |
| 22 | 3 | 0 | 0 | 0 | 0 | 0 | 0.1 | 0 | 0 | 0 | 0 | 0 | 96.9 |
| 23 | 2 | 0 | 0 | 0 | 0 | 0.1 | 0 | 0 | 0 | 0 | 0 | 0 | 68.5 |
| 24 | 2 | 0 | 0 | 0 | 0.1 | 0 | 0 | 0 | 0 | 0 | 0 | 0 | 68.5 |
| 25 | 1 | 0 | 0 | 0.1 | 0 | 0 | 0 | 0 | 0 | 0 | 0 | 0 | 89.0 |
| 26 | 1 | 0 | 0.1 | 0 | 0 | 0 | 0 | 0 | 0 | 0 | 0 | 0 | 49.5 |
| 27 | 0.2 | 0.1 | 0 | 0 | 0 | 0 | 0 | 0 | 0 | 0 | 0 | 0 | 49.9 |
| 28 | 0.2 | 1 | 1 | 1 | 1 | 1 | 1 | 1 | 1 | 1 | 1 | 1 | 53.3 |
| 29 | 4 | 0 | 0 | 1 | 0 | 1 | 0 | 1 | 0 | 0 | 0 | 0 | 83.7 |
| 30 | 4 | 0 | 1 | 0 | 0 | 0 | 0 | 1 | 0 | 1 | 0 | 0 | 65.1 |
| 31 | 3 | 1 | 1 | 0 | 0 | 1 | 0 | 0 | 1 | 1 | 0 | 1 | 45.5 |
| 32 | 3 | 0 | 1 | 1 | 0 | 0 | 1 | 0 | 1 | 0 | 0 | 1 | 82.8 |

| | Composition of raw material powder (% by mass) | | | | | | | | | | Exp. | Exp. | Exp. |
|---|---|---|---|---|---|---|---|---|---|---|---|---|---|
| No. | Co | B | N | P | Cu | Al | Si | (A) | (B) | (C) | (1) | (2) | (3) |
| 1 | 15.8 | 0 | 0 | 0 | 0 | 0 | 0 | 16 | 0 | 0 | 0.2 | 5 | 16 |
| 2 | 19.5 | 0 | 0 | 0 | 0 | 0 | 0 | 30 | 0 | 0 | 0.3 | 5 | 30 |
| 3 | 27.2 | 0 | 0 | 0 | 0 | 0 | 0 | 27 | 0 | 0 | 0.4 | 5 | 27 |
| 4 | 27.8 | 0 | 0 | 0 | 0 | 0 | 0 | 26 | 0 | 0 | 0.4 | 4.5 | 26 |
| 5 | 15.8 | 0 | 0 | 0 | 0 | 0 | 0 | 17 | 0 | 0 | 0.2 | 4 | 17 |
| 6 | 14.3 | 0 | 0 | 0 | 0 | 0 | 0 | 25 | 0 | 0 | 0.2 | 3.5 | 25 |
| 7 | 43.5 | 0 | 0 | 0 | 0 | 0 | 0 | 10 | 0 | 0 | 0.5 | 3 | 10 |
| 8 | 27.0 | 0 | 0 | 0 | 0 | 0 | 0 | 30 | 0 | 0 | 0.4 | 2.5 | 30 |
| 9 | 7.6 | 0 | 0 | 0 | 0 | 0 | 0 | 22 | 0 | 0 | 0.1 | 2 | 22 |

TABLE 1-continued

| | | | | | | | | | | | | | |
|---|---|---|---|---|---|---|---|---|---|---|---|---|---|
| 10 | 7.5 | 0 | 0 | 0 | 0 | 0 | 0 | 24 | 0 | 0 | 0.1 | 1.5 | 24 |
| 11 | 6.9 | 0 | 0 | 0 | 0 | 0 | 0 | 30 | 0 | 0 | 0.1 | 1 | 30 |
| 12 | 23.3 | 0 | 0 | 0 | 0 | 0 | 0 | 22 | 0 | 0 | 0.3 | 0.5 | 22 |
| 13 | 30.3 | 0 | 0 | 0 | 0 | 0 | 0 | 24 | 0 | 0 | 0.4 | 0.3 | 24 |
| 14 | 27.9 | 0 | 0 | 0 | 0 | 0 | 0 | 30 | 0 | 0 | 0.4 | 0.2 | 30 |
| 15 | 35.4 | 0 | 0 | 0 | 0 | 0 | 0 | 29 | 0 | 0 | 0.5 | 0.2 | 29 |
| 16 | 21.8 | 0 | 0 | 0 | 0 | 0 | 0 | 27 | 0 | 0 | 0.3 | 0.2 | 27 |
| 17 | 9.5 | 0 | 0 | 0 | 0 | 0 | 0 | 0.1 | 0 | 0 | 0.1 | 5 | 0.1 |
| 18 | 9.5 | 0 | 0 | 0 | 0 | 0 | 0 | 0.1 | 0 | 0 | 0.1 | 5 | 0.1 |
| 19 | 19.2 | 0 | 0 | 0 | 0 | 0 | 0 | 0.1 | 0 | 0 | 0.2 | 4 | 0.1 |
| 20 | 38.4 | 0 | 0 | 0 | 0 | 0 | 0 | 0.1 | 0 | 0 | 0.4 | 4 | 0.1 |
| 21 | 19.4 | 0 | 0 | 0 | 0 | 0 | 0 | 0.1 | 0 | 0 | 0.2 | 3 | 0.1 |
| 22 | 0.0 | 0 | 0 | 0 | 0 | 0 | 0 | 0.1 | 0 | 0 | 0 | 3 | 0.1 |
| 23 | 29.4 | 0 | 0 | 0 | 0 | 0 | 0 | 0.1 | 0 | 0 | 0.3 | 2 | 0.1 |
| 24 | 29.4 | 0 | 0 | 0 | 0 | 0 | 0 | 0.1 | 0 | 0 | 0.3 | 2 | 0.1 |
| 25 | 9.9 | 0 | 0 | 0 | 0 | 0 | 0 | 0.1 | 0 | 0 | 0.1 | 1 | 0.1 |
| 26 | 49.5 | 0 | 0 | 0 | 0 | 0 | 0 | 0.1 | 0 | 0 | 0.5 | 1 | 0.1 |
| 27 | 49.9 | 0 | 0 | 0 | 0 | 0 | 0 | 0.1 | 0 | 0 | 0.5 | 0.2 | 0.1 |
| 28 | 35.5 | 0 | 0 | 0 | 0 | 0 | 0 | 11 | 0 | 0 | 0.4 | 0.2 | 11 |
| 29 | 9.3 | 0 | 0 | 0 | 0 | 0 | 0 | 3 | 0 | 0 | 0.1 | 4 | 3 |
| 30 | 27.9 | 0 | 0 | 0 | 0 | 0 | 0 | 3 | 0 | 0 | 0.3 | 4 | 3 |
| 31 | 45.5 | 0 | 0 | 0 | 0 | 0 | 0 | 6 | 0 | 0 | 0.5 | 3 | 6 |
| 32 | 9.2 | 0 | 0 | 0 | 0 | 0 | 0 | 5 | 0 | 0 | 0.1 | 3 | 5 |

| No. | Process | Quenching temperature (° C.) | Quenching time (min) | Tempering temperature (° C.) | Tempering time (min) | Mesh size (μm) |
|---|---|---|---|---|---|---|
| 1 | WA | — | — | 700 | 30 | 53 |
| 2 | CP | — | — | 600 | 30 | 90 |
| 3 | DA | — | — | 650 | 30 | 63 |
| 4 | WA | — | — | 550 | 60 | 53 |
| 5 | GA(Ar) | — | — | 550 | 30 | 75 |
| 6 | GA(Ar) | 1050 | 5 | 700 | 30 | 45 |
| 7 | DA | — | — | 500 | 60 | 63 |
| 8 | DA | — | — | 450 | 60 | 53 |
| 9 | GA(N$_2$) | — | — | 600 | 30 | 125 |
| 10 | WA | — | — | 600 | 30 | 63 |
| 11 | GA(Ar) | — | — | 550 | 60 | 90 |
| 12 | WA | — | — | — | — | 90 |
| 13 | WA | — | — | — | — | 63 |
| 14 | WA | — | — | — | — | 63 |
| 15 | CP | 1000 | 5 | — | — | 63 |
| 16 | GA(N$_2$) | — | — | 450 | 60 | 63 |
| 17 | DA | — | — | 350 | 120 | 150 |
| 18 | CP | — | — | 400 | 60 | 125 |
| 19 | WA | — | — | 400 | 60 | 106 |
| 20 | GA(Ar) | — | — | 350 | 60 | 150 |
| 21 | GA(Ar) | — | — | 350 | 90 | 45 |
| 22 | WA | — | — | 400 | 30 | 63 |
| 23 | GA(N$_2$) | — | — | 400 | 60 | 63 |
| 24 | WA | — | — | 350 | 120 | 150 |
| 25 | GA(Ar) | — | — | 400 | 90 | 150 |
| 26 | WA | — | — | 400 | 90 | 75 |
| 27 | WA | — | — | — | — | 125 |
| 28 | CP | — | — | — | — | 90 |
| 29 | DA | 1000 | 3 | 650 | 30 | 90 |
| 30 | GA(Ar) | — | — | 700 | 30 | 125 |
| 31 | GA(Ar) | — | — | 450 | 60 | 106 |
| 32 | WA | — | — | 500 | 60 | 63 |

| No. | Average grain size (μm) | Saturation magnetization (T) | Average crystal grain size (μm) | Area ratio of residual austenite phase (%) | FR (MHz) | Note |
|---|---|---|---|---|---|---|
| 1 | 26 | 1.06 | 2 | 5 or less | 900 | Inventive example |
| 2 | 45 | 1.08 | 18 | 5 or less | 960 | |
| 3 | 31 | 1.02 | 8 | 5 or less | 950 | |
| 4 | 28 | 1.14 | 2 | 5 or less | 880 | |
| 5 | 39 | 1.18 | 5 | 5 or less | 780 | |
| 6 | 23 | 1.18 | 10 | 5 or less | 750 | |
| 7 | 30 | 1.27 | 6 | 5 or less | 630 | |
| 8 | 28 | 1.43 | 6 | 5 or less | 650 | |
| 9 | 69 | 1.55 | 6 | 5 or less | 550 | |
| 10 | 31 | 1.48 | 3 | 5 or less | 500 | |
| 11 | 46 | 1.41 | 9 | 5 or less | 460 | |
| 12 | 47 | 1.80 | 4 | 10 | 360 | |
| 13 | 34 | 1.81 | 3 | 10 | 350 | |
| 14 | 33 | 1.82 | 2 | 5 | 360 | |

TABLE 1-continued

| | | | | | |
|---|---|---|---|---|---|
| 15 | 32 | 1.55 | 25 | 5 | 350 |
| 16 | 34 | 1.85 | 5 | 5 or less | 350 |
| 17 | 79 | 1.32 | 5 | 5 or less | 840 |
| 18 | 67 | 1.21 | 19 | 5 or less | 840 |
| 19 | 59 | 1.36 | 3 | 5 or less | 700 |
| 20 | 73 | 1.66 | 7 | 5 or less | 700 |
| 21 | 24 | 1.80 | 7 | 5 or less | 590 |
| 22 | 30 | 1.57 | 2 | 5 or less | 590 |
| 23 | 31 | 1.81 | 7 | 5 or less | 460 |
| 24 | 73 | 1.81 | 5 | 5 or less | 460 |
| 25 | 73 | 1.82 | 6 | 5 or less | 340 |
| 26 | 42 | 1.81 | 5 | 5 or less | 340 |
| 27 | 63 | 1.84 | 3 | 5 | 240 |
| 28 | 43 | 1.82 | 24 | 10 | 280 |
| 29 | 48 | 1.42 | 12 | 5 or less | 720 |
| 30 | 61 | 1.46 | 6 | 5 or less | 720 |
| 31 | 49 | 1.29 | 9 | 5 or less | 610 |
| 32 | 31 | 1.64 | 3 | 5 or less | 610 |

Remark 1) (A) = Group IV to VI elements % + Mn % + Ni %
Remark 2) (B) = B % + N % + P %
Remark 3) (C) = Cu % + Al % + Si %
Remark 4) Process: WA → Water atomization,
GA (Ar) → Argon gas atomization,
GA (N$_2$) → Nitrogen gas atomization,
DA → Disk atomization,
CP → Casting pulverization

TABLE 2

| | Composition of raw material powder (% by mass) | | | | | | | | | | | | |
|---|---|---|---|---|---|---|---|---|---|---|---|---|---|
| No. | C | Ti | Zr | Hf | V | Nb | Ta | Cr | Mo | W | Mn | Ni | Fe |
| 33 | 2 | 0 | 0 | 0 | 1 | 0 | 0 | 0 | 0 | 1 | 0 | 1 | 57.0 |
| 34 | 2 | 0 | 0 | 1 | 0 | 0 | 1 | 0 | 0 | 0 | 0 | 0 | 57.6 |
| 35 | 1 | 0 | 1 | 0 | 0 | 1 | 0 | 0 | 0 | 0 | 1 | 0 | 57.6 |
| 36 | 1 | 0 | 0 | 0 | 0 | 1 | 0 | 0 | 0 | 1 | 0 | 1 | 86.4 |
| 37 | 4.5 | 0 | 1 | 0 | 3 | 0 | 3 | 3 | 2 | 3 | 0 | 2 | 54.9 |
| 38 | 4.5 | 3 | 2 | 0 | 3 | 1 | 3 | 3 | 2 | 3 | 0 | 3 | 43.5 |
| 39 | 3 | 1 | 1 | 1 | 2 | 0 | 2 | 3 | 1 | 0 | 1 | 1 | 49.2 |
| 40 | 3 | 2 | 0 | 3 | 0 | 2 | 1 | 0 | 2 | 3 | 2 | 1 | 55.3 |
| 41 | 3 | 2 | 0 | 3 | 2 | 2 | 0 | 3 | 1 | 2 | 2 | 3 | 45.0 |
| 42 | 3 | 2 | 2 | 2 | 1 | 1 | 1 | 3 | 0 | 1 | 0 | 1 | 56.0 |
| 43 | 2 | 1 | 0 | 3 | 2 | 3 | 3 | 3 | 2 | 0 | 0 | 1 | 78.0 |
| 44 | 2 | 0 | 1 | 1 | 0 | 2 | 2 | 2 | 3 | 1 | 1 | 3 | 80.0 |
| 45 | 1 | 3 | 2 | 1 | 2 | 3 | 2 | 3 | 2 | 0 | 3 | 1 | 52.9 |
| 46 | 1 | 0 | 1 | 3 | 2 | 0 | 2 | 1 | 0 | 2 | 1 | 2 | 76.5 |
| 47 | 0.5 | 1 | 0 | 2 | 0 | 1 | 3 | 2 | 3 | 2 | 1 | 3 | 57.0 |
| 48 | 0.5 | 0 | 3 | 2 | 2 | 0 | 1 | 3 | 3 | 0 | 3 | 2 | 48.2 |
| 49 | 0.2 | 0 | 2 | 3 | 1 | 1 | 3 | 3 | 1 | 1 | 1 | 0 | 58.0 |
| 50 | 0.2 | 0 | 0 | 0 | 0 | 3 | 1 | 3 | 0 | 3 | 2 | 0 | 51.8 |
| 51 | 3 | 0 | 0 | 1 | 1 | 0 | 0 | 2 | 2 | 2 | 1 | 2 | 45.6 |
| 52 | 3 | 1 | 2 | 2 | 2 | 1 | 1 | 0 | 1 | 1 | 1 | 1 | 59.2 |
| 53 | 2 | 2 | 0 | 0 | 0 | 0 | 1 | 1 | 0 | 1 | 1 | 1 | 40.5 |
| 54 | 2 | 1 | 1 | 0 | 0 | 1 | 1 | 0 | 1 | 1 | 1 | 2 | 63.2 |
| 55 | 1 | 0 | 1 | 1 | 1 | 1 | 2 | 2 | 0 | 1 | 0 | 1 | 79.0 |
| 56 | 1 | 1 | 0 | 1 | 0 | 1 | 0 | 1 | 0 | 0 | 2 | 2 | 56.7 |
| 57 | 0.5 | 2 | 2 | 1 | 1 | 2 | 1 | 1 | 0 | 2 | 1 | 0 | 43.2 |
| 58 | 0.5 | 2 | 0 | 1 | 2 | 0 | 2 | 2 | 1 | 2 | 2 | 0 | 59.7 |
| 59 | 4 | 0 | 1 | 1 | 1 | 2 | 0 | 1 | 1 | 0 | 0 | 2 | 64.8 |
| 60 | 4 | 2 | 0 | 2 | 0 | 1 | 0 | 0 | 1 | 1 | 1 | 2 | 65.6 |
| 61 | 3 | 0 | 2 | 2 | 1 | 0 | 0 | 0 | 2 | 2 | 0 | 0 | 77.4 |
| 62 | 3 | 0 | 1 | 2 | 2 | 1 | 0 | 1 | 0 | 1 | 1 | 2 | 84.0 |
| 63 | 3 | 2 | 1 | 1 | 0 | 0 | 0 | 2 | 0 | 0 | 1 | 2 | 50.4 |
| 64 | 3 | 0 | 0 | 0 | 1 | 0 | 0 | 1 | 1 | 2 | 1 | 2 | 77.4 |

| | Composition of raw material powder (% by mass) | | | | | | | Exp. | Exp. | Exp. |
|---|---|---|---|---|---|---|---|---|---|---|
| No. | Co | B | N | P | Cu | Al | Si | (A) | (B) | (C) |
| | | | | | | | | (1) | (2) | (3) |
| 33 | 38.0 | 0 | 0 | 0 | 0 | 0 | 0 | 3 | 0 | 0 | 0.4 | 2 | 3 |
| 34 | 38.4 | 0 | 0 | 0 | 0 | 0 | 0 | 2 | 0 | 0 | 0.4 | 2 | 2 |
| 35 | 38.4 | 0 | 0 | 0 | 0 | 0 | 0 | 3 | 0 | 0 | 0.4 | 1 | 3 |
| 36 | 9.6 | 0 | 0 | 0 | 0 | 0 | 0 | 3 | 0 | 0 | 0.1 | 1 | 3 |
| 37 | 23.5 | 0.01 | 0 | 0 | 0 | 0 | 0 | 17 | 0.01 | 0 | 0.3 | 4.51 | 17 |
| 38 | 29.0 | 0 | 0.01 | 0 | 0 | 0 | 0 | 23 | 0.01 | 0 | 0.4 | 4.51 | 23 |
| 39 | 32.8 | 2 | 0 | 0 | 0 | 0 | 0 | 13 | 2 | 0 | 0.4 | 5 | 13 |

TABLE 2-continued

| No. | (col2) | (col3) | (col4) | (col5) | (col6) | (col7) | (col8) | (col9) | (col10) | (col11) | (col12) | (col13) | (col14) | Process | Quenching temperature (° C.) | Quenching time (min) | Tempering temperature (° C.) | Tempering time (min) | Mesh size (μm) | Average grain size (μm) | Saturation magnetization (T) | Average crystal grain size (μm) | Area ratio of residual austenite phase (%) | FR (MHz) | Note |
|---|---|---|---|---|---|---|---|---|---|---|---|---|---|---|---|---|---|---|---|---|---|---|---|---|---|
| 40 | 23.7 | 0 | 0.4 | 0 | 0 | 0 | 0 | 16 | 0.4 | 0 | 0.3 | 3.4 | 16 | GA(N₂) | — | — | 550 | 30 | 45 | 24 | 1.70 | 8 | 5 or less | 660 | |
| 41 | 30.0 | 0 | 0 | 2 | 0 | 0 | 0 | 20 | 2 | 0 | 0.4 | 5 | 20 | GA(N₂) | — | — | 550 | 60 | 125 | 68 | 1.64 | 6 | 5 or less | 720 | |
| 42 | 24.0 | 1 | 1 | 0 | 0 | 0 | 0 | 15 | 2 | 0 | 0.3 | 5 | 15 | GA(Ar) | — | — | 600 | 30 | 106 | 50 | 1.47 | 9 | 5 or less | 700 | |
| 43 | 0.0 | 0 | 1 | 1 | 0 | 0 | 0 | 18 | 2 | 0 | 0 | 4 | 18 | WA | — | — | 500 | 60 | 125 | 65 | 1.48 | 4 | 5 or less | 580 | |
| 44 | 0.0 | 1 | 0 | 1 | 0 | 0 | 0 | 16 | 2 | 0 | 0 | 4 | 16 | WA | 1000 | 2 | 600 | 30 | 90 | 45 | 1.45 | 8 | 5 or less | 580 | |
| 45 | 22.7 | 0.5 | 0.5 | 0.5 | 0 | 0 | 0 | 22 | 1.5 | 0 | 0.3 | 2.5 | 22 | CP | — | — | 600 | 30 | 90 | | | | | | |
| 46 | 8.5 | 0 | 0 | 0.01 | 0 | 0 | 0 | 14 | 0.01 | 0 | 0.1 | 1.01 | 14 | GA(Ar) | — | — | 550 | 60 | 63 | | | | | | |
| 47 | 24.4 | 0.05 | 0.05 | 0 | 0 | 0 | 0 | 18 | 0.1 | 0 | 0.3 | 0.6 | 18 | WA | — | — | — | — | 125 | | | | | | |
| 48 | 32.2 | 0 | 0 | 0.1 | 0 | 0 | 0 | 19 | 0.1 | 0 | 0.4 | 0.6 | 19 | GA(N₂) | — | — | — | — | 125 | | | | | | |
| 49 | 24.8 | 1 | 0 | 0 | 0 | 0 | 0 | 16 | 1 | 0 | 0.3 | 1.2 | 16 | GA(N₂) | — | — | — | — | 150 | | | | | | |
| 50 | 34.5 | 0 | 0.2 | 1 | 0 | 0 | 0 | 12 | 1.2 | 0 | 0.4 | 1.4 | 12 | GA(N₂) | 1050 | 3 | 400 | 60 | 106 | | | | | | |
| 51 | 30.4 | 0 | 0 | 0 | 10 | 0 | 0 | 11 | 0 | 10 | 0.4 | 3 | 21 | WA | — | — | 500 | 60 | 106 | | | | | | |
| 52 | 14.8 | 0 | 0 | 0 | 0 | 10 | 0 | 13 | 0 | 10 | 0.2 | 3 | 23 | GA(Ar) | — | — | 550 | 60 | 150 | | | | | | |
| 53 | 40.5 | 0 | 0 | 0 | 0 | 0 | 10 | 7 | 0 | 10 | 0.5 | 2 | 17 | WA | — | — | 500 | 60 | 125 | | | | | | |
| 54 | 15.8 | 0 | 0 | 0 | 5 | 5 | 0 | 9 | 0 | 10 | 0.2 | 2 | 19 | GA(Ar) | — | — | 450 | 60 | 150 | | | | | | |
| 55 | 0.0 | 0 | 0 | 0 | 0 | 5 | 5 | 10 | 0 | 10 | 0 | 1 | 20 | WA | — | — | — | — | 125 | | | | | | |
| 56 | 24.3 | 0 | 0 | 0 | 5 | 0 | 5 | 8 | 0 | 10 | 0.3 | 1 | 18 | GA(N₂) | — | — | 500 | 60 | 125 | | | | | | |
| 57 | 43.2 | 0 | 0 | 0 | 0.1 | 0 | 0 | 13 | 0 | 0.1 | 0.5 | 0.5 | 13.1 | CP | — | — | 400 | 60 | 75 | | | | | | |
| 58 | 25.6 | 0 | 0 | 0 | 0 | 0 | 0.1 | 14 | 0 | 0.2 | 0.3 | 0.5 | 14.2 | GA(N₂) | — | — | — | — | 125 | | | | | | |
| 59 | 16.2 | 0 | 0 | 0 | 2 | 2 | 2 | 9 | 0 | 6 | 0.2 | 4 | 15 | WA | 1000 | 5 | 650 | 30 | 45 | | | | | | |
| 60 | 16.4 | 0 | 0 | 0 | 0 | 0 | 4 | 10 | 0 | 4 | 0.2 | 4 | 14 | GA(Ar) | — | — | 450 | 60 | 150 | | | | | | |
| 61 | 8.6 | 1 | 0 | 0 | 0 | 0 | 1 | 9 | 1 | 1 | 0.1 | 4 | 10 | DA | — | — | 500 | 60 | 63 | | | | | | |
| 62 | 0.0 | 0 | 1 | 0 | 0 | 1 | 0 | 11 | 1 | 1 | 0 | 4 | 12 | GA(Ar) | — | — | 500 | 60 | 106 | | | | | | |
| 63 | 33.6 | 0 | 0 | 1 | 1 | 1 | 1 | 9 | 1 | 3 | 0.4 | 4 | 12 | GA(N₂) | — | — | 600 | 30 | 150 | | | | | | |
| 64 | 8.6 | 1 | 0.3 | 0.5 | 0 | 1 | 0 | 8 | 1.8 | 1 | 0.1 | 4.8 | 9 | CP | — | — | 600 | 30 | 106 | | | | | | |

Rows 33-44 (from prior page continuation, process/measurement data):

| No. | Process | Quenching temperature (° C.) | Quenching time (min) | Tempering temperature (° C.) | Tempering time (min) | Mesh size (μm) | Average grain size (μm) | Saturation magnetization (T) | Average crystal grain size (μm) | Area ratio of residual austenite phase (%) | FR (MHz) | Note |
|---|---|---|---|---|---|---|---|---|---|---|---|---|
| 33 | GA(N₂) | — | — | 600 | 60 | 150 | 72 | 1.83 | 8 | 5 or less | 470 | Inventive example |
| 34 | CP | — | — | 550 | 30 | 63 | 33 | 1.84 | 21 | 5 or less | 470 | |
| 35 | WA | — | — | 550 | 60 | 75 | 41 | 1.80 | 5 | 5 or less | 350 | |
| 36 | GA(N₂) | — | — | 600 | 30 | 106 | 50 | 1.83 | 9 | 5 or less | 350 | |
| 37 | GA(Ar) | — | — | 450 | 60 | 106 | 52 | 1.39 | 7 | 5 or less | 840 | |
| 38 | GA(N₂) | — | — | 650 | 30 | 106 | 54 | 1.18 | 7 | 5 or less | 840 | |
| 39 | DA | — | — | 450 | 60 | 125 | 61 | 1.50 | 9 | 5 or less | 690 | |

TABLE 2-continued

| | | | | | |
|---|---|---|---|---|---|
| 45 | 45 | 1.81 | 16 | 5 or less | 460 |
| 46 | 30 | 1.87 | 8 | 5 or less | 390 |
| 47 | 65 | 1.87 | 5 | 10 | 350 |
| 48 | 62 | 1.81 | 6 | 5 | 350 |
| 49 | 73 | 1.85 | 5 | 5 | 330 |
| 50 | 53 | 1.83 | 13 | 5 or less | 320 |
| 51 | 58 | 1.01 | 5 | 5 or less | 670 |
| 52 | 74 | 1.08 | 8 | 5 or less | 200 |
| 53 | 59 | 1.01 | 2 | 5 or less | 200 |
| 54 | 74 | 1.03 | 9 | 5 or less | 220 |
| 55 | 68 | 1.02 | 5 | 45 | 210 |
| 56 | 62 | 1.19 | 7 | 5 or less | 210 |
| 57 | 36 | 1.68 | 19 | 5 or less | 330 |
| 58 | 63 | 1.81 | 7 | 35 | 320 |
| 59 | 23 | 1.04 | 9 | 5 or less | 520 |
| 60 | 79 | 1.13 | 6 | 5 or less | 510 |
| 61 | 31 | 1.43 | 8 | 5 or less | 590 |
| 62 | 50 | 1.32 | 5 | 5 or less | 600 |
| 63 | 77 | 1.34 | 5 | 5 or less | 530 |
| 64 | 53 | 1.35 | 21 | 5 or less | 600 |

Remark 1) (A) = Group IV to VI elements % + Mn % + Ni %
Remark 2) (B) = B % + N % + P %
Remark 3) (C) = Cu % + Al % + Si %
Remark 4) Process: WA → Water atomization,
GA (Ar) → Argon gas atomization,
GA (N$_2$) → Nitrogen gas atomization,
DA → Disk atomization,
CP → Casting pulverization

TABLE 3

| | Composition of raw material powder (% by mass) | | | | | | | | | | | | |
|---|---|---|---|---|---|---|---|---|---|---|---|---|---|
| No. | C | Ti | Zr | Hf | V | Nb | Ta | Cr | Mo | W | Mn | Ni | Fe |
| 65 | <u>6</u> | 4 | 3 | 4 | 0 | 4 | 4 | 1 | 1 | 0 | 4 | 2 | 40.2 |
| 66 | <u>0.1</u> | 1 | 2 | 5 | 2 | 5 | 4 | 0 | 0 | 5 | 2 | 3 | 35.5 |
| 67 | <u>0</u> | 2 | 4 | 1 | 2 | 4 | 5 | 2 | 0 | 1 | 4 | 2 | 51.1 |
| 68 | 5 | 1 | 0 | 0 | 0 | 1 | 0 | 30 | 0 | 0 | 2 | 2 | 41.3 |
| 69 | 2.5 | 0 | 0 | 0 | 31 | 0 | 0 | 0 | 0 | 0 | 0 | 0 | 39.9 |
| 70 | 1 | 0 | 0 | 0 | 0 | 0 | 0 | 33 | 0 | 0 | 0 | 0 | 59.4 |
| 71 | 0.2 | 5 | 3 | 4 | 4 | 5 | 5 | 5 | 1 | 0 | 1 | 0 | 40.1 |
| 72 | 3 | 2 | 0 | 3 | 2 | 2 | 0 | 3 | 1 | 2 | 2 | 3 | 44.4 |
| 73 | 3 | 2 | 2 | 2 | 2 | 1 | 1 | 3 | 0 | 1 | 0 | 1 | 55.3 |
| 74 | 2 | 1 | 0 | 3 | 2 | 3 | 3 | 3 | 2 | 0 | 0 | 1 | 77.0 |
| 75 | 2 | 0 | 1 | 1 | 0 | 2 | 2 | 2 | 3 | 1 | 1 | 3 | 79.0 |
| 76 | 3 | 0 | 0 | 1 | 1 | 0 | 0 | 2 | 2 | 2 | 1 | 2 | 44.4 |
| 77 | 3 | 1 | 2 | 2 | 2 | 1 | 1 | 0 | 1 | 1 | 1 | 1 | 56.8 |
| 78 | 2 | 2 | 0 | 0 | 0 | 0 | 1 | 1 | 0 | 1 | 1 | 1 | 38.0 |
| 79 | 3 | 1 | 0 | 0 | 1 | 0 | 0 | 0 | 5 | 0 | 0 | 3 | 34.8 |
| 80 | 3 | 1 | 1 | 0 | 0 | 1 | 0 | 0 | 1 | 1 | 0 | 1 | 36.4 |
| 81 | 3 | 1 | 2 | 2 | 2 | 1 | 1 | 5 | 1 | 1 | 1 | 1 | 52.8 |
| 82 | 5 | 0 | 0 | 0 | 0 | 0 | 0 | 0 | 0 | 0 | 0 | 0 | 85.4 |
| 83 | 5 | 0 | 0 | 0 | 0 | 0 | 0 | 0 | 0 | 0 | 0 | 0 | 85.4 |
| 84 | 4 | 0 | 0 | 0 | 0 | 0 | 0 | 0 | 0 | 0 | 0 | 0 | 76.7 |
| 85 | 4 | 0 | 0 | 0 | 0 | 0 | 0 | 0 | 0 | 0 | 0 | 0 | 57.5 |
| 86 | 3 | 0 | 0 | 0 | 0 | 0 | 0 | 0 | 0 | 0 | 0 | 0 | 77.5 |
| 87 | 3 | 0 | 0 | 0 | 0 | 0 | 0 | 0 | 0 | 0 | 0 | 0 | 96.9 |
| 88 | 2 | 0 | 0 | 0 | 0 | 0 | 0 | 0 | 0 | 0 | 0 | 0 | 68.5 |
| 89 | 2 | 0 | 0 | 0 | 0 | 0 | 0 | 0 | 0 | 0 | 0 | 0 | 68.5 |
| 90 | 1 | 0 | 0 | 0 | 0 | 0 | 0 | 0 | 0 | 0 | 0 | 0 | 89.0 |
| 91 | 1 | 0 | 0 | 0 | 0 | 0 | 0 | 0 | 0 | 0 | 0 | 0 | 49.5 |
| 92 | 0.2 | 0 | 0 | 0 | 0 | 0 | 0 | 0 | 0 | 0 | 0 | 0 | 49.9 |

| | Composition of raw material powder (% by mass) | | | | | | | | | Exp. | Exp. | Exp. |
|---|---|---|---|---|---|---|---|---|---|---|---|---|
| No. | Co | B | N | P | Cu | Al | Si | (A) | (B) | (C) | (1) | (2) | (3) |
| 65 | 26.8 | 0 | 0 | 0 | 0 | 0 | 0 | 27 | 0 | 0 | 0.4 | <u>6</u> | 27 |
| 66 | 35.5 | 0 | 0 | 0 | 0 | 0 | 0 | 29 | 0 | 0 | 0.5 | <u>0.1</u> | 29 |
| 67 | 21.9 | 0 | 0 | 0 | 0 | 0 | 0 | 27 | 0 | 0 | 0.3 | 0 | 27 |
| 68 | 17.7 | 0 | 0 | 0 | 0 | 0 | 0 | <u>36</u> | 0 | 0 | 0.3 | 5 | 36 |
| 69 | 26.6 | 0 | 0 | 0 | 0 | 0 | 0 | <u>31</u> | 0 | 0 | 0.4 | 2.5 | <u>31</u> |
| 70 | 6.6 | 0 | 0 | 0 | 0 | 0 | 0 | <u>33</u> | 0 | 0 | 0.1 | 1 | <u>33</u> |
| 71 | 26.7 | 0 | 0 | 0 | 0 | 0 | 0 | <u>33</u> | 0 | 0 | 0.4 | 0.2 | <u>33</u> |
| 72 | 29.6 | 0 | 0 | 3 | 0 | 0 | 0 | 20 | <u>3</u> | 0 | 0.4 | <u>6</u> | 20 |
| 73 | 23.7 | 1.5 | 1.5 | 0 | 0 | 0 | 0 | 15 | <u>3</u> | 0 | 0.3 | <u>6</u> | 15 |

TABLE 3-continued

| No. | | | | | | | | | | | | | |
|---|---|---|---|---|---|---|---|---|---|---|---|---|---|
| 74 | 0.0 | 0 | 1.5 | 1.5 | 0 | 0 | 0 | 18 | 3 | 0 | 0.0 | 5 | 18 |
| 75 | 0.0 | 2 | 0 | 1 | 0 | 0 | 0 | 16 | 3 | 0 | 0.0 | 5 | 16 |
| 76 | 29.6 | 0 | 0 | 0 | 12 | 0 | 0 | 11 | 0 | 12 | 0.4 | 3 | 23 |
| 77 | 14.2 | 0 | 0 | 0 | 0 | 13 | 0 | 13 | 0 | 13 | 0.2 | 3 | 26 |
| 78 | 38.0 | 0 | 0 | 0 | 0 | 0 | 15 | 7 | 0 | 15 | 0.5 | 2 | 22 |
| 79 | 52.2 | 0 | 0 | 0 | 0 | 0 | 0 | 10 | 0 | 0 | 0.6 | 3 | 10 |
| 80 | 54.6 | 0 | 0 | 0 | 0 | 0 | 0 | 6 | 0 | 0 | 0.6 | 3 | 6 |
| 81 | 13.2 | 0 | 0 | 0 | 0 | 13 | 0 | 18 | 0 | 13 | 0.2 | 3 | 31 |
| 82 | 9.5 | 0 | 0 | 0 | 0 | 0 | 0 | 0 | 0 | 0 | 0.1 | 5 | 0 |
| 83 | 9.5 | 0 | 0 | 0 | 0 | 0 | 0 | 0 | 0 | 0 | 0.1 | 5 | 0 |
| 84 | 19.2 | 0 | 0 | 0 | 0 | 0 | 0 | 0 | 0 | 0 | 0.2 | 4 | 0 |
| 85 | 38.4 | 0 | 0 | 0 | 0 | 0 | 0 | 0 | 0 | 0 | 0.4 | 4 | 0 |
| 86 | 19.4 | 0 | 0 | 0 | 0 | 0 | 0 | 0 | 0 | 0 | 0.2 | 3 | 0 |
| 87 | 0.0 | 0 | 0 | 0 | 0 | 0 | 0 | 0 | 0 | 0 | 0.0 | 3 | 0 |
| 88 | 29.4 | 0 | 0 | 0 | 0 | 0 | 0 | 0 | 0 | 0 | 0.3 | 2 | 0 |
| 89 | 29.4 | 0 | 0 | 0 | 0 | 0 | 0 | 0 | 0 | 0 | 0.3 | 2 | 0 |
| 90 | 9.9 | 0 | 0 | 0 | 0 | 0 | 0 | 0 | 0 | 0 | 0.1 | 1 | 0 |
| 91 | 49.5 | 0 | 0 | 0 | 0 | 0 | 0 | 0 | 0 | 0 | 0.5 | 1 | 0 |
| 92 | 49.9 | 0 | 0 | 0 | 0 | 0 | 0 | 0 | 0 | 0 | 0.5 | 0.2 | 0 |

| No. | Process | Quenching temperature (° C.) | Quenching time (min) | Tempering temperature (° C.) | Tempering time (min) | Mesh size (μm) |
|---|---|---|---|---|---|---|
| 65 | DA | — | — | 650 | 30 | 63 |
| 66 | CP | 1000 | 5 | — | — | 63 |
| 67 | GA(N$_2$) | — | — | 450 | 60 | 63 |
| 68 | CP | — | — | 600 | 30 | 90 |
| 69 | DA | — | — | 450 | 60 | 53 |
| 70 | GA(Ar) | — | — | 550 | 60 | 90 |
| 71 | WA | — | — | — | — | 63 |
| 72 | GA(N$_2$) | — | — | 550 | 60 | 125 |
| 73 | GA(Ar) | — | — | 600 | 30 | 106 |
| 74 | WA | — | — | 500 | 60 | 125 |
| 75 | WA | 1000 | 2 | 600 | 30 | 90 |
| 76 | WA | — | — | 500 | 60 | 106 |
| 77 | GA(Ar) | — | — | 550 | 60 | 150 |
| 78 | WA | — | — | 500 | 60 | 125 |
| 79 | DA | — | — | 500 | 60 | 63 |
| 80 | GA(Ar) | — | — | 450 | 60 | 106 |
| 81 | GA(Ar) | — | — | 550 | 60 | 150 |
| 82 | DA | — | — | 350 | 120 | 150 |
| 83 | CP | — | — | 400 | 60 | 125 |
| 84 | WA | — | — | 400 | 60 | 106 |
| 85 | GA(Ar) | — | — | 350 | 60 | 150 |
| 86 | GA(Ar) | — | — | 350 | 90 | 45 |
| 87 | WA | — | — | 400 | 30 | 63 |
| 88 | GA(N$_2$) | — | — | 400 | 60 | 63 |
| 89 | WA | — | — | 350 | 120 | 150 |
| 90 | GA(Ar) | — | — | 400 | 90 | 150 |
| 91 | WA | — | — | 400 | 90 | 75 |
| 92 | WA | — | — | — | — | 125 |

| No. | Average grain size (μm) | Saturation magnetization (T) | Average crystal grain size (μm) | Area ratio of residual austenite phase (%) | FR (MHz) | Note |
|---|---|---|---|---|---|---|
| 65 | 31 | 0.98 | 9 | 5 or less | 1000 | Comparative example |
| 66 | 30 | 1.69 | 24 | 15 | 150 | |
| 67 | 37 | 1.97 | 6 | 5 or less | 130 | |
| 68 | 47 | 0.92 | 23 | 5 or less | 980 | |
| 69 | 27 | 0.93 | 8 | 5 or less | 650 | |
| 70 | 49 | 0.96 | 8 | 5 or less | 470 | |
| 71 | 33 | 0.97 | 2 | 5 | 370 | |
| 72 | 65 | 0.91 | 6 | 5 or less | 740 | |
| 73 | 53 | 0.91 | 9 | 5 or less | 720 | |
| 74 | 60 | 1.37 | 3 | 5 or less | 610 | |
| 75 | 47 | 1.34 | 6 | 5 or less | 600 | |
| 76 | 60 | 1.06 | 4 | 5 or less | 130 | |
| 77 | 80 | 1.05 | 6 | 5 or less | 150 | |
| 78 | 63 | 1.09 | 2 | 5 or less | 140 | |
| 79 | 30 | 0.97 | 7 | 5 or less | 630 | |
| 80 | 54 | 0.95 | 9 | 5 or less | 610 | |
| 81 | 70 | 0.70 | 9 | 5 or less | 150 | |
| 82 | 77 | 1.24 | 6 | 5 or less | 170 | |
| 83 | 65 | 1.28 | 20 | 5 or less | 180 | |
| 84 | 60 | 1.41 | 3 | 5 or less | 170 | |
| 85 | 70 | 1.63 | 6 | 5 or less | 170 | |
| 86 | 28 | 1.80 | 7 | 5 or less | 150 | |

TABLE 3-continued

| | | | | | |
|---|---|---|---|---|---|
| 87 | 31 | 1.38 | 3 | 5 or less | 160 |
| 88 | 30 | 1.85 | 7 | 5 or less | 150 |
| 89 | 75 | 1.83 | 4 | 5 or less | 160 |
| 90 | 72 | 1.85 | 5 | 5 or less | 150 |
| 91 | 44 | 1.86 | 5 | 5 or less | 140 |
| 92 | 61 | 1.82 | 4 | 5 | 150 |

Remark 1) (A) = Group IV to VI elements % + Mn % + Ni %
Remark 2) (B) = B % + N % + P %
Remark 3) (C) = Cu % + Al % + Si %
Remark 4) Process: WA → Water atomization,
GA (Ar) → Argon gas atomization,
GA ($N_2$) → Nitrogen gas atomization,
DA → Disk atomization,
CP → Casting pulverization Comparative Examples Nos. 65 to 92 in Tables 1 to 3 will now be described. Comparative Example No. 65, which has a high C content and a high value in Expression (2), exhibits low saturation magnetization. Comparative Example No. 66, which has a low C content, exhibits a low frequency FR at which tan δ reaches 0.1. Comparative Example No. 67, which does not contain C, exhibits a low FR, like Comparative Example No. 66. Comparative Example No. 68, which has a high total content (A) of Group IV to VI elements, Mn and Ni, exhibits low saturation magnetization. Comparative Example No. 69, which has a high (A) content and a high value in Expression (3), exhibits low saturation magnetization.

Comparative Example No. 70, which has a high (A) content and a large value in Expression (3), exhibits low saturation magnetization, like Comparative Example No. 69. Comparative Example No. 71, which has a high (A) content and a large value in Expression (3), exhibits low saturation magnetization, like Comparative Examples Nos. 69 and 70. Comparative Example No. 72, which has a high total content (B) of B, N and P and a high value in Expression (2), exhibits low saturation magnetization. Comparative Example No. 73, which has a low (B) content and a high value in Expression (2), exhibits low saturation magnetization.

Comparative Examples Nos. 74 and 75, which have a high (B) content and have a thickness of 250 to 300 μm as described above, which is larger than the thickness 180 to 220 μm of Inventive Examples and Comparative Examples other than Nos. 72 and 73. Comparative Example No. 76, which has a high total content (C) of Cu, Al, and Si, exhibits a low FR. Comparative Example No. 77, which has a high total (C) content, exhibits a low FR, like Comparative Example 76.

Comparative Example No. 78, which has a high (C) content, exhibits a low FR, like Comparative Examples Nos. 76 and 77. Comparative Example No. 79, which has a low value in Expression (1), exhibits low saturation magnetization. Comparative Example No. 80, which has a large value in Equation (1), exhibits low saturation magnetization, like Comparative Example No. 79. Comparative Example No. 81, which has a high (C) content and a large value in Expression (3), exhibits low saturation magnetization and a low FR. Comparative Examples Nos. 82 to 92, which have a (A) content of 0, each exhibit a low FR.

In contrast, all metal magnetic powders of inventive Examples Nos. 1 to 64 satisfy the requirements of the present invention, that is, these samples have a high saturation magnetization (T) and a high frequency FR (MHz) at which tan δ reaches 0.1.

The invention claimed is:

1. A magnetic powder for high frequency use, comprising, in percent by mass, 0.2 to 5.0% C and at least one selected from Group IV to VI elements, Mn, and Ni in a total amount of 5 to 30%, the balance being Fe or/and Co, inclusive 0% for Co, and incidental impurities, wherein the saturation magnetization exceeds 1.0 T and satisfies Expression (1): Co%/(Co%+Fe%)≤0.50, and wherein a main phase of the magnetic powder is a martensite crystalline phase.

2. The magnetic powder according to claim 1, further comprising at least one element selected from B, N and P in a total amount of 2% or less by mass, and satisfies Expression (2): C%+B%+N%+P%≤5.0%.

3. The magnetic powder according to claim 1, further comprising at least one element selected from Cu, Al and Si in a total amount of 10% or less by mass, and satisfies Expression (3): Ti%+Zr%+Hf%+V%+Nb%+Ta%+Cr%+Mo%+W% +Mn%+Ni%+Cu%+Al%+Si%≤30%.

4. A magnetic resin composition comprising the magnetic powder according to claim 1.

5. The magnetic powder according to claim 2, further comprising at least one element selected from Cu, Al and Si in a total amount of 10% or less by mass, and satisfies Expression (3): Ti%+Zr%+Hf%+V% +Nb%+Ta%+Cr%+Mo%+W% +Mn%+Ni%+Cu%+Al%+Si%≤30%.

6. A magnetic resin composition comprising the magnetic powder according to claim 2.

7. A magnetic resin composition comprising the magnetic powder according to claim 3.

8. A magnetic resin composition comprising the magnetic powder according to claim 5.

* * * * *